US007024461B1

(12) United States Patent
Janning et al.

(10) Patent No.: US 7,024,461 B1
(45) Date of Patent: Apr. 4, 2006

(54) SESSION INITIATION PROTOCOL ENABLED SET-TOP DEVICE

(75) Inventors: William J. Janning, Allen, TX (US); Trip Ingle, Allen, TX (US); Gregory T. Osterhout, Coppell, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/561,834

(22) Filed: Apr. 28, 2000

(51) Int. Cl.
*G06F 15/16* (2006.01)
(52) U.S. Cl. ...................................... 709/207; 709/227
(58) Field of Classification Search ................ 709/223, 709/227, 228, 206–207; 725/106, 131, 151; 379/900; 705/513
See application file for complete search history.

(56) References Cited

U.S. PATENT DOCUMENTS

| 6,201,538 B1 * | 3/2001 | Wugofski .................... 715/716 |
| 6,229,532 B1 * | 5/2001 | Fujii ........................... 715/733 |
| 6,317,884 B1 * | 11/2001 | Eames et al. ................ 709/217 |
| 6,490,274 B1 * | 12/2002 | Kim ........................... 370/352 |
| 6,591,292 B1 * | 7/2003 | Morrison et al. ........... 709/206 |
| 6,628,194 B1 * | 9/2003 | Hellebust et al. ............ 340/7.5 |
| 6,640,239 B1 * | 10/2003 | Gidwani ...................... 709/203 |
| 6,690,675 B1 * | 2/2004 | Kung et al. .................. 370/401 |
| 6,760,429 B1 * | 7/2004 | Hung et al. ............. 379/265.09 |
| 6,775,267 B1 * | 8/2004 | Kung et al. .................. 370/352 |
| 6,778,661 B1 * | 8/2004 | Yumoto et al. ......... 379/265.09 |
| 6,785,716 B1 * | 8/2004 | Nobakht ...................... 709/219 |
| 6,826,597 B1 * | 11/2004 | Lonnroth et al. ........... 709/207 |
| 6,836,478 B1 * | 12/2004 | Huang et al. ................ 370/352 |
| 6,856,616 B1 * | 2/2005 | Schuster et al. ............ 370/352 |
| 6,928,653 B1 * | 8/2005 | Ellis et al. ..................... 725/50 |
| 2002/0044570 A1 * | 4/2002 | Gurusami et al. .......... 370/487 |

OTHER PUBLICATIONS

Gun et al., "An implementation of VoIP cable modem", Sep. 17, 1999, Tencon 99. Proceedings of the IEEE Region 10 Conference, vol. 2, pp. 1532-1535.*

(Continued)

*Primary Examiner*—Andrew Caldwell
*Assistant Examiner*—Douglas Blair

(57) ABSTRACT

A method and apparatus for handling subscriber services from different sources without requiring interaction with different devices. The present invention also provides a method and apparatus for receiving multimedia services using session initiation protocol (SIP) messages received from a source, such as a server on a network. In one embodiment, a set-top device is provided in which a SIP control is provided to register a subscriber with a server using SIP messages. A connection to a network, such as the Internet, is provided to communicate with the server. The set-top device is placed in line with the audio and video source to control audio and video streams presented to the subscriber. The set-top device is also configured to receive voice calls from a public switched telephone network (PSTN). Further, the set-top device includes a remote control mechanism, such as an infrared (IR) transmitter and receiver to receive input from the subscriber and to control other devices using IR signals. Also, subscriber services customized for a particular subscriber may be directed to the subscriber at a location when the subscriber registers with the server through a set-top device at that location using SIP. Services, such as, for example, call screening, channel guides, video on demand, and Web browsing are provided through the set-top device and messaging with a server using SIP messages.

4 Claims, 6 Drawing Sheets

OTHER PUBLICATIONS

Rabbat et al., "QoS support for integrated services over CATV", Jan. 1999, Communications Magazine, IEEE, vol. 37, Issue 1, pp. 64-68.*

Young, "New protocol connects voice over IP", Dec. 13, 1999, Network World, http://www.nwfusion.com/news/tech/1213tech.html.*

Huitema, "An architecture for residential Internet telephony service", May 1999, Network, IEEE, vol. 13, Issue 3, pp. 50-56.*

Schulzrinne, "A comprehensive multimedia control architecture for the Internet", May 1997, Network and Operating System Support for Digital Audio and Video, 1997, Proceedings of the IEEE 7th international Workshop. pp. 65-76.*

Handley, et al.; SIP: Session Initiation Protocol; Mar. 1999; pp. 1-134.

* cited by examiner

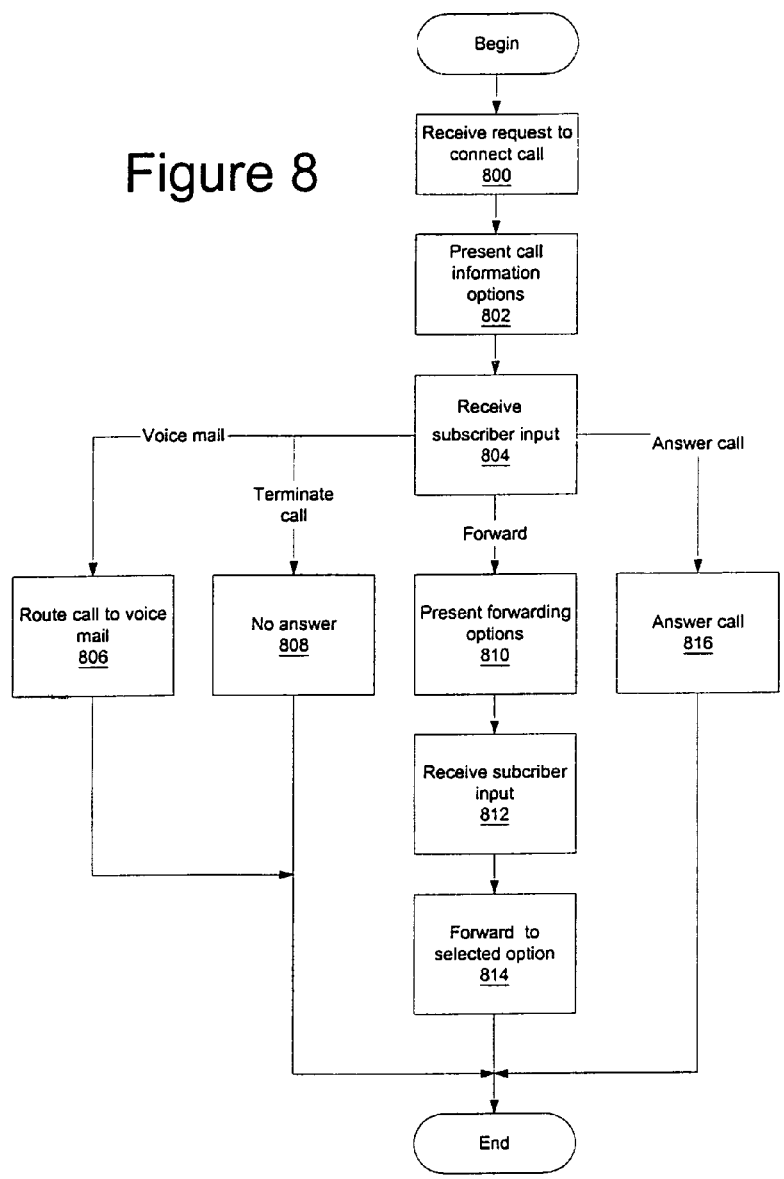

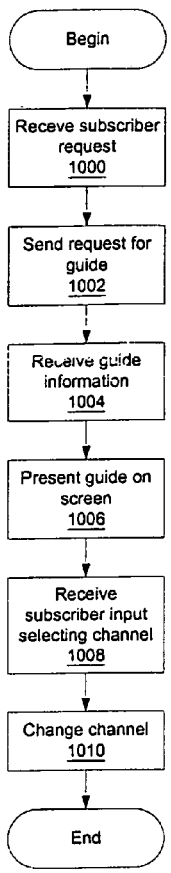
Figure 10
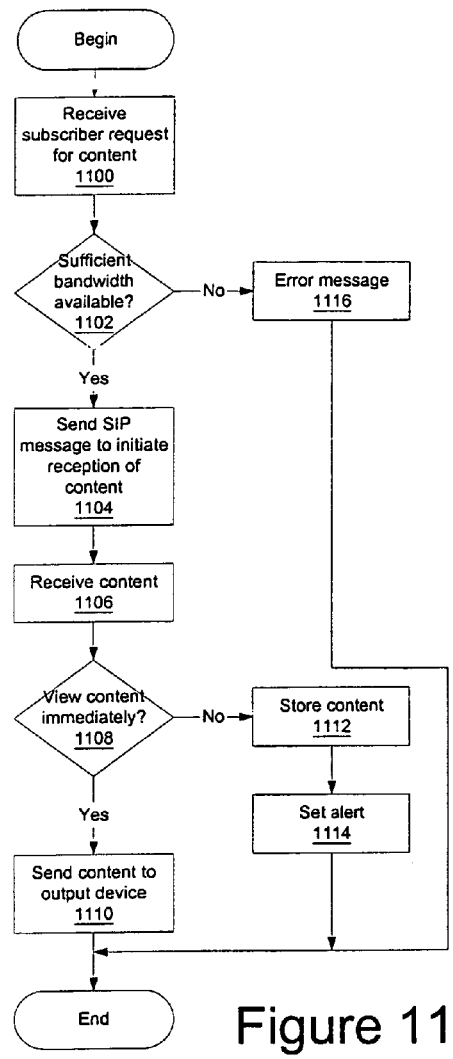
Figure 11
Figure 12
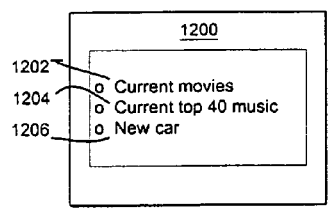

SESSION INITIATION PROTOCOL ENABLED SET-TOP DEVICE

FIELD OF THE INVENTION

The present invention relates generally to an improved communications system and in particular to a communications device. Still more particularly, the present invention relates generally to a method and apparatus for enabling a communications device to perform functions using a session initiated protocol.

BACKGROUND OF THE INVENTION

Programming, such as subscription and pay-per-view video services, are delivered to a subscriber's premises by both satellite and cable transmission systems. The systems provide both analog and digital data streams. A set-top device is typically used to receive programming and distribute it in the premises of a subscriber. As used herein, the term "set-top" device or "set-top" system is an aggregation of components used to provide subscriber services. As communications technology continues to expand, subscribers are being presented with an ever increasing number of information sources in addition to satellite and cable transmission systems. For example, video programs may be received over networks, such as the Internet or public switched telephone systems. Currently, such video programs are received by a computer or other device connected to the Internet. Other communications services, such as telephone service over public switched telephone systems, are handled by terminal devices, such as telephones. As a result, a subscriber must interact with a number of different devices to use all of the different types of services being offered by different providers. Having to use many different devices to access services can be frustrating to a subscriber.

Therefore, it would be advantageous to have an improved method and apparatus for handling subscriber services from different sources without requiring interaction with difference devices.

SUMMARY OF THE INVENTION

The present invention provides a method and apparatus for handling subscriber services from different sources without requiring interaction with different devices. The present invention also provides a method and apparatus for receiving multimedia services using session initiation protocol (SIP) messages received from a source, such as a server on a network. In one embodiment, a set-top device is provided in which a SIP control is provided to register a subscriber with a server using SIP messages. A connection to a network, such as the Internet, is provided to communicate with the server. The set-top device is placed in line with the audio and video source to control audio and video streams presented to the subscriber. The set-top device is also configured to receive voice calls from a public switched telephone network (PSTN). Further, the set-top device includes a remote control mechanism, such as an infrared (IR) transmitter and receiver to receive input from the subscriber and to control other devices using IR signals. Also, subscriber services customized for a particular subscriber may be directed to the subscriber at a location when the subscriber registers with the server through a set-top device at that location using SIP. Services, such as, for example, call screening, channel guides, video on demand, and Web browsing are provided through the set-top device and messaging with a server using SIP messages.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart of a process for call screening in accordance with a preferred embodiment of the present invention;

FIG. 9 is a diagram of a channel guide in accordance with a preferred embodiment of the present invention;

FIG. 10 is a flowchart of a process for displaying channel guide information in accordance with a preferred embodiment of the present invention;

FIG. 11 is a flowchart of a process for retrieving different types of media streams in accordance with a preferred embodiment of the present invention;

FIG. 12 is a diagram of a Web page pushed to a subscriber in accordance with a preferred embodiment of the present invention.

DETAILED DESCRIPTION OF THE PREFERRED EMBODIMENT

Figure 1:
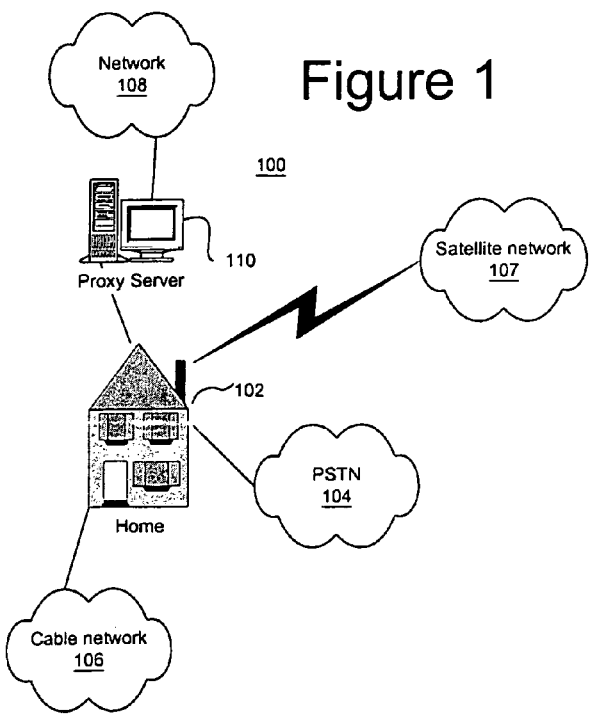
FIG. 1 is a diagram of a communications system in which the present invention may be implemented.

With reference now to the figures and in particular with reference now to FIG. 1, a diagram of a communications system is illustrated in which the present invention may be implemented. Communications system 100 includes a home 102, which is able to receive services from a number of different sources. Home 102 has a connection to public switched telephone network (PSTN) 104 through which home 102 is able to use telephone services. This connection is usually provided through twisted-pair wire in the subscriber loop in PSTN 104. PSTN 104 provides an analog transmission network for voice calls. Additionally, a connection between cable network 106 and home 102 is present in which the connections are provided by a coaxial cable. Cable television services to home 102 are provided through a content provider using cable network 106. Both analog and digital services may be provided through cable network 106. Satellite network 107 provides digital services to home 102.

A connection from home 102 to network 108 is present. In this example, network 108 is the Internet, with network 108 representing a worldwide collection of networks and gateways that use the TCP/IP suite of protocols to communicate with one another. At the heart of the Internet is a backbone of high-speed data communication lines between major nodes or host computers consisting of thousands of commercial, government, educational, and other computer systems that route data and messages. Of course, network 108 also may be implemented as a number of different types of networks, such as, for example, network 108 may be a local area network (LAN) or a wide area network (WAN). Additionally, network 108 may be a broadband network providing broadband services. A broadband service is a service requiring transmission channels capable of supporting rates greater than 1.5 Mbps, a primary rate integrated services digital network (ISDN), TS1, or DS1 in digital terminology.

In this example, proxy server 110 provides access for various services to home 102 across network 108. For example, proxy server 110 may be used to direct a call using voice over Internet Protocol (IP) to home 102. This call may originate from a device in PSTN 104, with part of the call path being over network 108. Also, proxy server 110 may receive requests from home 102 for video and stream the requested video to home 102. The connection between home 102 and proxy server 110 may take various forms, such as an Ethernet connection established using an asymmetric digital subscriber loop (ADSL) line or an integrated services digital network (ISDN) line. Further, a high bandwidth twisted pair or optical fiber also may be used to provide the connection between home 102 and proxy server 110.

In accordance with a preferred embodiment of the present invention, a text based signaling protocol, such as, for example, session initiation protocol (SIP), is used to create, modify, and terminate sessions with one or more subscribers at home 102. A device or application operating on a device may establish a connection or session with a server on a network, such as a broadband network, to receive multimedia services. These services may include, for example, video telephony, audio stations, television station broadcasts, call screening services, channel guides, video on demand, and Web browsing services. Multimedia sources provide these services. Multimedia sources may be, for example, cable companies, satellite programming companies, television network companies, and internet broadcast companies. The multimedia sources also may take the form of multimedia data located in a storage device, such as, for example, movies in a digital form on hard disk drives. Further, the present invention also provides a mechanism in which a particular user or subscriber can be identified with a particular device. The identification of the subscriber is used to determine the type of multimedia services provided. These determinations may be made either at the device or at the server. In the depicted examples, the device takes the form of a set-top device located in home 102. Of course, the present invention is not limited to a set-top device and may be applied to other communications devices, such as, for example, a computer or a television.

SIP is an application layer control (signaling) protocol for creating, modifying, and terminating sessions with one or more participants. These sessions include Internet multimedia conferences, Internet telephone calls, and multimedia distribution. Members in a session can communicate via multicast, a mesh of unicast relations, or a combination of these.

SIP invitations are used to create sessions and carry session descriptions, which allow participants to agree on a set of compatible media types. SIP supports user mobility by proxying and redirecting requests to the user's current location. Users can register their current location. SIP is not tied to any particular conference control protocol. SIP is designed to be independent of the lower-layer transport protocol and can be extended with additional capabilities.

SIP can be used to initiate sessions, as well as invite members to sessions that have been advertised and established by other means. Sessions can be advertised using multicast protocols such as SAP, electronic mail, news groups, Web pages, or directories (LDAP), among others.

SIP transparently supports name mapping and redirection services, allowing the implementation of ISDN and Intelligent Network telephony subscriber services. These facilities also enable personal mobility. Personal mobility is the ability of end users to originate calls, receive calls, and access subscribed telecommunication services on any terminal and in any location, as well as the ability of the network to identify end users as they move. Personal mobility is based on the use of a unique personal identity (i.e. personal number). Personal mobility complements terminal mobility, such as the ability to maintain communications when moving a single end system from one subnet to another. SIP supports five facets of establishing and terminating multimedia communications: (1) user location: determination of the end system to be used for communication; (2) user capabilities: determination of the media and media parameters to be used; (3) user availability: determination of the willingness of the called party to engage in communications; (4) call setup: "ringing", establishment of call parameters at both the called and calling party; and (5) call handling: including transfer and termination of calls.

Through SIP, a subscriber at home 102 can register the subscriber's current location. In such a case, the subscriber, when at home 102, can have all calls directed to the subscriber sent to home 102 by proxy server 110. A proxy server is an intermediary program that acts as both a server and a client for the purpose of making requests on behalf of other clients. Requests are serviced internally or by passing them on, possibly after translation, to other servers. A proxy server interprets and, if necessary, rewrites a request message before forwarding it. A proxy server may be implemented using, for example, a computer. The proxy on the server is an application that establishes the connection between the sender and receiver. Proxy servers may act as a fire wall or cache information, such as web pages, email, or addresses.

SIP is independent of lower layer transport protocols and is used to start sessions, while lower layer transport protocols are used to carry the data. A session involves the activities taking place during the establishment and release of a connection on a network. SIP allows for unicasting or multicasting and can invite both persons and robots, such as a media storage service.

The registration capabilities provided by SIP allow for implementation of ISDN and Intelligent Network (IN) services. More specifically, SIP provides for personal mobility in which a subscriber is able to originate and receive calls and access subscribed telecommunications services in any location. A SIP enabled communications system is able to identify a subscriber as the subscriber moves from location to location. The personal mobility in SIP is based on a unique personal identifier, such as a personal number. SIP services for a subscriber can be directed to the subscriber when the subscriber is located at home 102. In accordance with a preferred embodiment of the present invention, a SIP enabled set-top device is provided in home 102 to integrate services for a subscriber at home 102. More information on SIP may be found in "SIP: Session Initiation Protocol", IETF RFC 2543, http://ietf.org/rfc/rfc2543.txt, March 1999.

Figure 2:
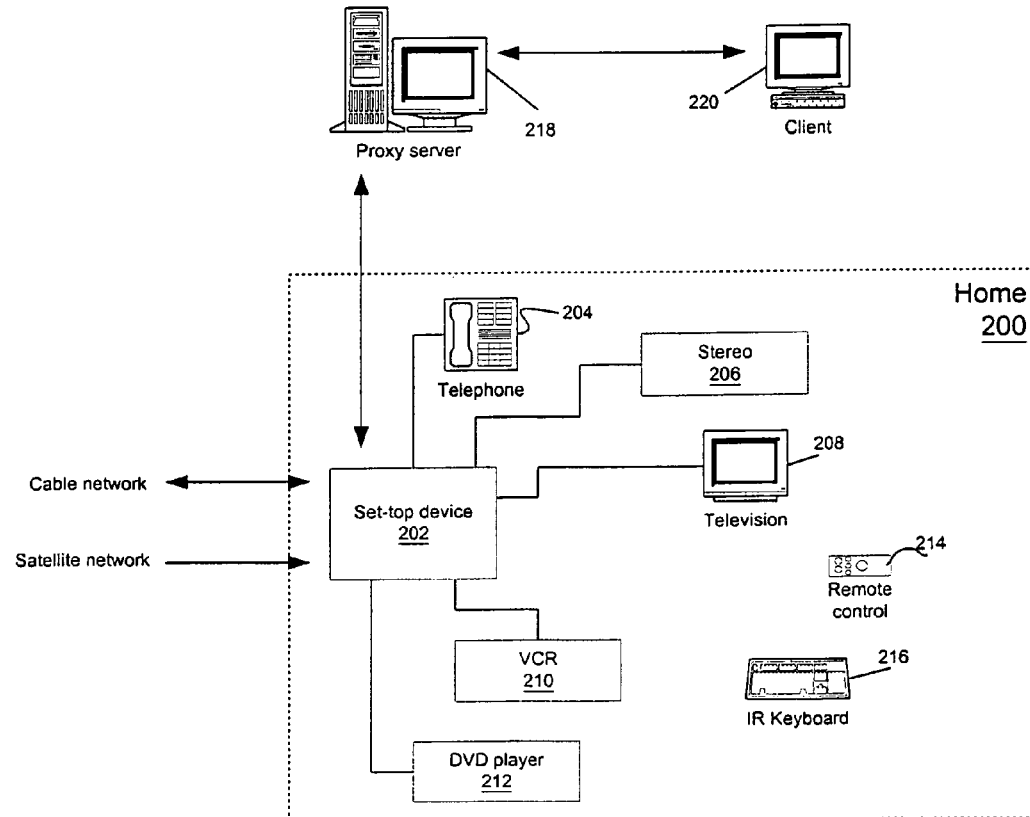
FIG. 2 is a diagram of components in a home in accordance with a preferred embodiment of the present invention.

Turning next to FIG. 2, a diagram of components in a home is depicted in accordance with a preferred embodiment of the present invention. In this example, home 200 is an example of a home in a communications system, such as home 102 in FIG. 1. Home 200 includes a set-top device 202, which provides a common point for distributing services in home 200. In this example, set-top device 202 acts as a client to receive services. Telephone 204 is connected to set-top device 202 through which a subscriber may receive telephone calls. Also, stereo 206 and television 208 are connected to set-top device 202 through which programming from a cable network may be displayed. Of course, a wireless connection also may be provided to a satellite service provided in place of or in addition to a cable content provider. Video cassette recorder (VCR) 210 and digital versatile disc (DVD) player 212 are also connected to set-top device 202. Set-top device 202 also provides a mechanism for subscriber input and control of devices using input devices, such as, for example, remote control 214 and infrared (IR) keyboard 216. Set-top device 202 is able to provide for control of both devices connected to set-top device 202 and to devices not connected to set-top device 202 through remote control 214 or IR keyboard 216. Remote control 214 or IR keyboard 216 also may include a microphone to allow for voice activated commands, recording, or transmitting a subscriber's voice to set-top device 202. This control may be provided using a number of different mechanisms. In the depicted example, an infrared (IR) system is used in which input or commands are received from remote control 214 or IR keyboard 216, and appropriate commands are transmitted to devices using IR transmissions. For example, set-top device 202 may program VCR 210 to record a program via remote control 214. The input may be received through a SIP message from proxy server 218 by the subscriber at client 220 in a different geographic location, which may be, for example, in the next room or at the office. Set-top device 202 programs VCR 210 by sending a set of IR signals recognized by VCR 210. Examples of IR programming systems are found in U.S. Pat. No. 5,151,789 entitled System and Method for Automatic, Unattended Recording of Cable Television Programs and U.S. Pat. No. 5,692,214, entitled System for Unattended Recording of Video Programs by Remote Control Transmitted Module Which Receives User Selection From a Personal Computer.

Figure 3:
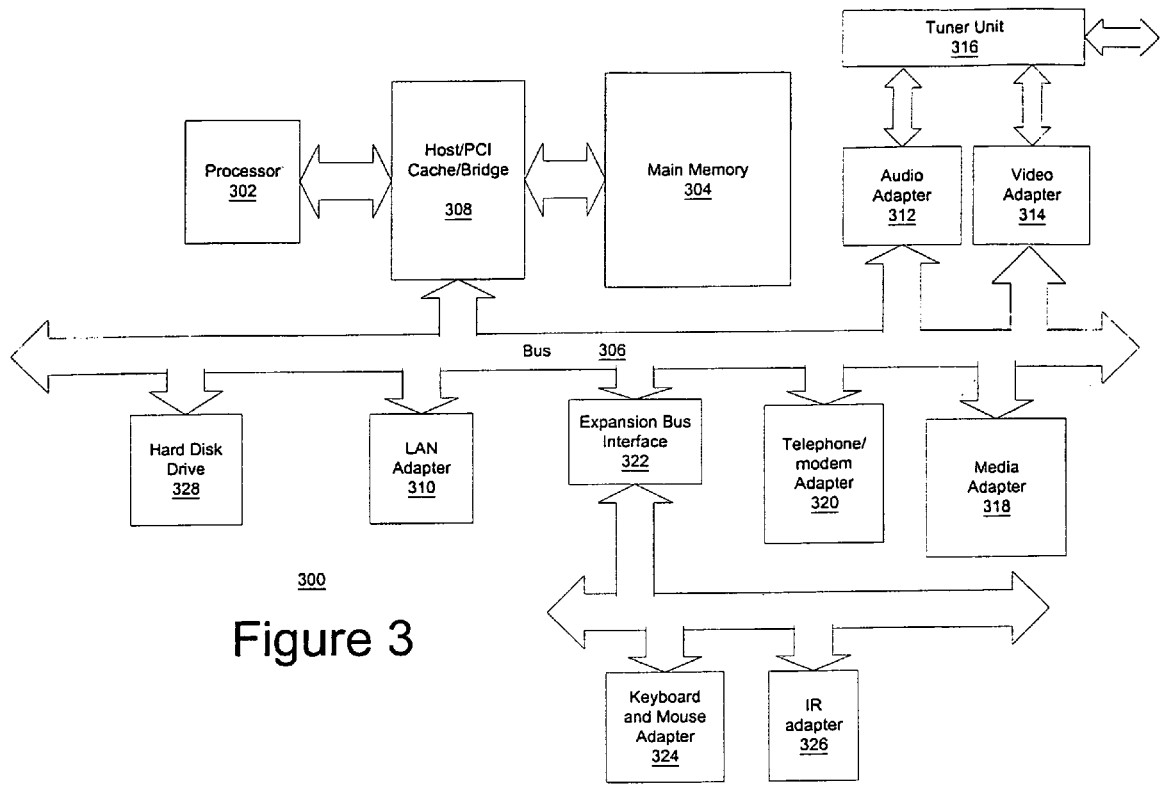
FIG. 3 is a block diagram illustrating a SIP enabled set-top device in accordance with a preferred embodiment of the present invention.

With reference now to FIG. 3, a block diagram illustrating a SIP enabled set-top device is depicted in accordance with a preferred embodiment of the present invention. Set-top device 300 is an example of a set-top device in which code or instructions implementing the processes of the present invention may be located.

Set-top device 300 is also referred to as a "set-top box". Set-top device 300, in a preferred embodiment, employs a peripheral component interconnect (PCI) local bus architecture. Although the depicted example employs a PCI bus, other bus architectures, such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Connections to PCI local bus 306 may be made through direct component interconnection or through add-in boards. Local area network (LAN) adapter 310 connects to PCI local bus 306 and provides a connection, such as an ethernet connection, to a proxy server, such as proxy server 110 in FIG. 1. In these examples, multimedia services may be delivered through the connection provided by LAN adapter 310. Delivery mechanisms, such as high bandwidth twisted pair, DSL, and optical fiber, are examples of other mechanisms, which may be used to deliver multimedia services. In this example, multimedia services, such as video on demand, channel guides, and browser functions, may be delivered through a single network connection. In such a case, a cable television connection may be unnecessary. LAN adapter 310 provides a physical connection to allow set-top device 300 to communicate with a server using SIP via a SIP enabled application or software located on set-top device 300. The SIP enabled application or software used to facilitate these multimedia services may be found in the form of instructions executed by processor 302. The instructions may be located in main memory 304 or in some other storage device, such as a read only memory or a hard disk drive.

Audio adapter 312 and video adapter 314 are connected to PCI local bus 306. These components also are connected to tuner unit 316 in set-top device 300. Tuner unit 316 receives radio frequency (RF) signals and sends audio components to audio adapter 312 and video adapter 314. These signals may be received from different sources, such as, for example, a cable network. In particular, tuner unit 316 will convert and filter frequency modulated (FM) channels into an intermediate frequency (IF) channel. Further, tuner unit 316 includes circuitry necessary to demodulate the signal to obtain video and audio data for transmission to audio adapter 312 and video adapter 314. Audio adapter 312 and video adapter 314 send the signals from tuner unit 316 to outputs for presentation to a user or subscriber.

Also, audio adapter 312 and video adapter 314 include inputs to receive audio and video for processing. For example, the inputs may be used to receive a program from a device, such as DVD player 212 in FIG. 2, for presentation on a television or other display attached to set-top device 300.

In this example, set-top device 300 also includes a media adapter 318. Media adapter 318 includes a general purpose programmable media processor for use in receiving and processing multiple media data streams including, for example, audio, video, and data. An example of a media processor, which may be used in media adapter 318, is found in U.S. Pat. No. 5,794,061, entitled General Purpose, Multiple Precision Parallel Operation, Programmable Media Processor. Media adapter 318 may provide output to various components connected to set-top device 300 in conjunction with or in place of audio adapter 312 and video adapter 314. A telephone/modem adapter 320 is also provided in which voice calls and data from a PSTN may be facilitated.

Next, expansion bus interface 322 provides a connection for a keyboard and mouse adapter 324 and an infrared (IR) adapter 326. A keyboard and a pointer, such as a mouse, may be attached by a cable to set-top device 300, or input may be received from a wireless keyboard, mouse, or remote control. Although, in the depicted examples, IR input devices are used, other types of wireless input systems may be used in combination with or in place of the IR system, such as, for example, a RF keyboard or remote control.

An operating system runs on processor 302 and is used to coordinate and provide control of various components within set-top device 300 in FIG. 3. The operating system may be a commercially available operating system such as NT Windows or Windows CE, which are available from Microsoft Corporation. An object oriented programming system, such as Java, may run in conjunction with the operating system and provides calls to the operating system from Java programs or applications executing on set-top device 300. "Java" is a trademark of Sun Microsystems, Inc. Instructions for the operating system, the object-oriented operating system, and applications or programs are located on storage devices, such as hard disk drive 328, and may be loaded into main memory 304 for execution by processor 302. For example, the applications running on set-top device 300 may receive SIP messages from LAN adapter 310 and present messages or perform functions through set-top device 300. The SIP messaging functions may be enabled in instructions, such as application programming interfaces (APIs).

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor set-top device. The depicted example in FIG. 3 and the above-described examples are not meant to imply architectural limitations. For example, the mechanism and processes of the present invention may be implemented in other types of devices other than a set-top device, such as a computer, a television, an adapter for a computer, or a personal computer configured for use in an automobile. Also, although a bus is illustrated, the components in FIG. 3 may be connected using any mechanism allowing communication between the components.

Figure 4:
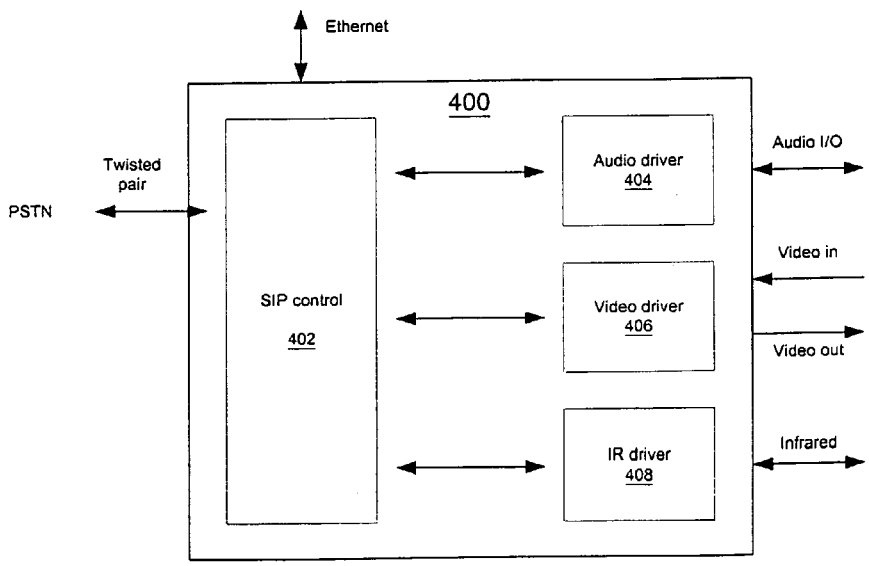
In FIG. 4 is a functional diagram of components in a SIP enabled application in accordance with a preferred embodiment of the present invention.

In FIG. 4, a functional diagram of components in a SIP enabled application is depicted in accordance with a preferred embodiment of the present invention. SIP application 400, in these examples, is implemented in a set-top device, as shown in set-top device 300 in FIG. 3. SIP application 400, in these examples, is employed to provide multimedia services to a user through a connection to a server.

SIP application 400 includes a SIP control 402, which controls audio driver 404, video driver 406, and IR driver 408 in these examples. These drivers form a multimedia interface in SIP application 400 to send multimedia content to output devices. SIP control 402 provides an interface through an ethernet connection to a network using LAN adapter 310 in FIG. 3. An interface for SIP control 402 to a PSTN also may be provided through a twisted pair using telephone/modem adapter 320 in FIG. 3. Audio driver 404 is software for processing audio using audio adapter 312 in FIG. 3, while video driver 406 is software for processing video using video adapter 314 in FIG. 3. Audio driver 404 allows for audio to be received at SIP application 400 from a source, such as a cable or satellite network, and transmitted to a device, such as, for example, a stereo or speakers in a television. Video driver 406 provides for receiving video in SIP application 400 and transmitting video from SIP application 400. The video may be received from a cable connection and transmitted to a television or other monitor. IR driver 408 is software for sending and receiving IR signals to control various devices in accordance with a preferred embodiment of the present invention. The device may include, for example, a VCR, CD player, DVD player, computer, or a television.

SIP control 402 includes the appropriate interfaces, such as, for example, application programming interfaces (APIs), to communicate with the various drivers in SIP application 400. The actual drivers employed depend on the hardware used to implement SIP application 400. More specifically, SIP control 402 exchanges SIP messages with a source, such as a proxy server, to setup a session. The session may involve, for example, a telephone call, a video, or controlling various devices. This control may be, for example, programming a VCR to record a program.

Although the depicted example in FIG. 4 shows SIP application 400 implemented in a set-top device, SIP application 400 may be implemented into other devices, such as, for example, a computer, a television, an adapter for use in a computer, or a personal computer configured for use in an automobile. The functions provided by SIP application 400 may be implemented entirely in software, hardware, or a combination of the two.

Figure 5:
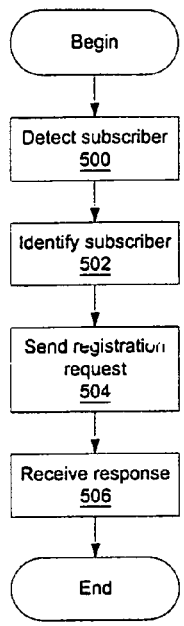
FIG. 5 is a flowchart of a process for registering a subscriber in accordance with a preferred embodiment of the present invention.

Turning next to FIG. 5, a flowchart of a process for registering a subscriber is depicted in accordance with a preferred embodiment of the present invention. The process is used in a set-top device to register a subscriber with a proxy server. In these examples, the process is implemented using instructions executed by a processor in the set-top device. Such a registration allows for subscriber services to be directed to the subscriber at the location of the set-top device. For example, telephone calls may be directed to the subscriber using the subscriber's personal number. This registration process involves the presently available register method in SIP, which allows a user agent to register with a server by sending a register request.

The process begins by detecting a subscriber at the set-top device (step 500). The subscriber may be detected in a number of ways. For example, the subscriber may be detected when the set-top device is turned on or when a control device, such as a remote control, is activated. Next, a personal number associated with the subscriber is identified (step 502). The personal number associated with the subscriber may be stored in a storage device, such as, for example, a hard disk drive or other nonvolatile memory, within the set-top device. Alternatively, the personal number may be identified by the subscriber entering the personal number. This number may be entered in a number of ways, such as through a keyboard or remote control unit. In this manner, multiple subscribers are able to access the set-top device. Next, the set-top device sends a register request to a proxy server for the subscriber (step 504). The proxy server will verify the subscriber and identify services associated with the subscriber. In this manner, services for the subscriber can be directed to the subscriber through the set-top device. This registration process allows for services and the billing of services to follow the subscriber, rather than being based upon a particular hardware unit. Next, the response is received (step 506) with the process terminating thereafter.

Figure 6:
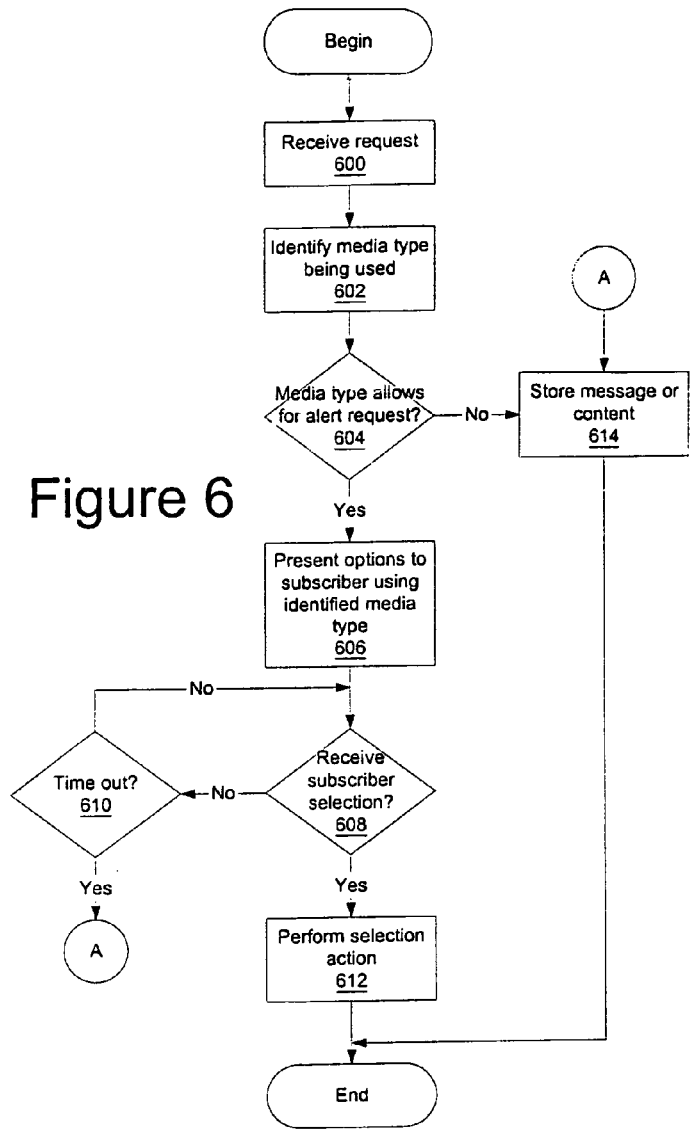
FIG. 6 is a flowchart of a process to handle requests received by a set-top device to route calls to a subscriber in accordance with a preferred embodiment of the present invention.

Turning next to FIG. 6, a flowchart of a process to handle requests received by a set-top device to route calls to a subscriber is depicted in accordance with a preferred embodiment of the present invention. In the depicted example, these processes are implemented as instructions executed by a processor, such as processor 302 in FIG. 3. The process begins with the set-top device receiving a request (step 600). This request may take different forms, such as, for example, a call from a calling party, a message, or a Web page being pushed to the subscriber. The type of media being used at the set-top device is identified (step 602). Step 602 may be accomplished in a number of ways, such as for example, polling for active data streams being sent to devices attached to the set-top device.

A determination is made as to whether the subscriber can be alerted using the identified media (step 604). For example, if the subscriber is watching the television, the subscriber may be alerted using a message on the screen and/or by an audio prompt to obtain the subscriber's attention in case the subscriber is not looking at the television screen. Thereafter, options are presented to the subscriber using a media type, which matches the media type in the request (step 606). A determination is made as to whether a subscriber selection has been received (step 608). A check is made as to whether a user input, such as, for example, the depressing of a selected key, has occurred. If a subscriber selection is not received, a determination is made as to whether a timeout has occurred (step 610). A timer function may be checked to see if time has expired to identify a timeout. If a timeout has not occurred, the process returns to step 608. When a subscriber selection is received in step 608, the selected action is performed (step 612) with the process terminating thereafter.

With reference again to step 610, if a timeout has occurred, the message or content is stored for later presentation to the subscriber (step 614) with the process terminating thereafter. The message, in this example, is stored in a persistent memory, such as a hard drive or nonvolatile random access memory. With reference again to step 604, if the media type being used does not allow for the subscriber to be alerted, the process also proceeds to step 614. This situation may occur, for example, if no devices are turned on or if the subscriber is only using the VCR to tape a program without the television being turned on. In these examples, the subscriber cannot be alerted using a device in the home. Alternatively, the set-top device may include controls to turn on a device to alert the subscriber. The controls may include, for example, sending an IR signal to turn on a television or stereo. With respect to outgoing calls, a subscriber may obtain a charge rate based on the identification of the subscriber, rather than the particular set-top device.

Figure 7A:
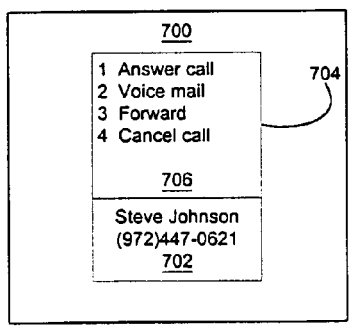
FIGS. 7A and 7B are diagrams illustrating a presentation of options to a subscriber for incoming call screening in accordance with a preferred embodiment of the present invention.
Figure 7B:
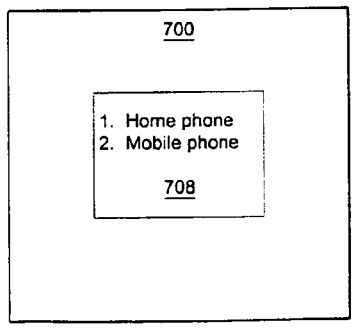

Turning next to FIGS. 7A and 7B, diagrams illustrating a presentation of options to a subscriber for incoming call screening are depicted in accordance with a preferred embodiment of the present invention. These options may be implemented using instructions executed by a processor in the set-top device, such as processor 302 in FIG. 3. In this example, the subscriber is viewing a program on display 700 of a television in FIG. 7A. An incoming call is routed to the set-top device and the set-top device displays incoming call information in section 702 of menu 704 in display 700. In this example, the call information includes an identification of a party and a telephone number. Additionally, call handling options are presented to the user in section 706 in menu 704. Some possible call handling options are to answer the call, send the call to voice mail, forward the call, or cancel the call. This information may be presented in a menu or guide type format while a program is currently being presented to the user. Input from the subscriber as to how the call should be handled may be generated using a remote control device. Based on the subscriber input, the set-top device may send back the appropriate SIP messages to handle the call.

In this example, if the subscriber decides to answer the call, the call may be routed to the set-top device, and the call may be facilitated through the devices connected to the set-top device. For example, the caller's voice may be presented to the subscriber through speakers in the television, and the subscriber may talk to the caller through a microphone located in the remote control. If the subscriber decides to send the call to voice mail, the set-top device may accept the call and route it to a voice mail system in the set-top device or may send a message to the proxy server to redirect the call to a voice mail service for the subscriber. If the subscriber decides to forward the call, menu 708 is displayed within display 700 in FIG. 7B. In this example, the subscriber may forward the call to a home phone or to a mobile phone. Depending on the selection made by the subscriber, the set-top device will send the appropriate SIP messages to have the call forwarded to the appropriate number. If the subscriber decides to cancel the call, the call will not be answered and may be terminated by the set-top device.

With reference now to FIG. 8, a flowchart of a process for call screening is depicted in accordance with a preferred embodiment of the present invention. The processes in FIG. 8 may be implemented in a SIP control component, such as SIP control 402 in FIG. 4. The process begins by receiving a request to connect a call to the subscriber (step 800). Thereafter, call information and call handling options are presented to the subscriber (step 802). These options may be presented in a number of ways. In the depicted example in FIG. 7A and FIG. 7B, the options are presented in a menu on a display. Alternatively, the options may be presented using audible voice prompts played through speaker, such as those in a television, stereo, or set-top device. Thereafter, subscriber input is received (step 804). This input may be received by depressing buttons on a remote control. In these examples, the handling of the call in response to subscriber input results in the set-top device sending the appropriate SIP messages to a proxy server. If the subscriber selection is voice mail, the call is routed to a voice mail system (step 806) with the process terminating thereafter. If the subscriber selection is to terminate the call, the call remains unanswered (step 808) with the process terminating thereafter.

A selection of a forwarding option results in the display of a menu with different forwarding selections (step 810). This menu may be a menu, such as menu 708 in FIG. 7B, in which different destinations may be selected in forwarding the call. Subscriber input is then received (step 812). Thereafter, the call is forwarded to the selected option (step 814) with the process terminating thereafter. If the subscriber input is to answer the call, the call is answered using the set-top device (step 816) with the process terminating thereafter.

The set-top device of the present invention also may provide channel guide information through a source, such as a proxy server, using SIP messaging. In this manner, channel guides for current programming and future programming may be provided. Further, these channel guides may be tailored to the specific preferences of a subscriber. A custom channel guide may be provided to the subscriber at any set-top device location at which the subscriber registers. After registering, a selected remote control button or command code may be used to initiate the sending of a SIP message to a server requesting channel guide information. Responses from the proxy server, in these examples, also are sent using SIP messages. Because SIP is session based and not call based, any information may be placed into the body of a SIP message. In this example, channel guide information is placed in SIP messages.

Turning next to FIG. 9, a diagram of a channel guide is depicted in accordance with a preferred embodiment of the present invention. Channel guide 900, in this example, is a channel guide that may be displayed using channel guide information returned in SIP messages. This channel guide may be a custom channel guide that can be presented to a subscriber at any set-top device at which the subscriber has registered with a server. The subscriber may scroll through channel guide 900 using a remote control device and select a desired channel. In response to such a selection, the set-top device sends the appropriate control signals, such as IR signals, to the television to change a channel. Alternatively, the set-top device selects the appropriate channel from the cable or satellite network.

With reference now to FIG. 10, a flowchart of a process for displaying channel guide information is depicted in accordance with a preferred embodiment of the present invention. The processes in FIG. 10 may be implemented in a SIP control component, such as SIP control 402 in FIG. 4. The process begins by receiving a subscriber request for a channel guide (step 1000). In response, a set-top device sends a request for a channel guide (step 1002). In the depicted example, the request is in the form of a SIP message sent to a proxy server. Channel guide information is received (step 1004), and the guide is presented on the screen of the television (step 1006). This channel guide information is received in SIP messages. Subscriber input selecting a channel from a channel guide is received (step 1008). In response to this input, the channel is changed to the selected channel (step 1010) with the process terminating thereafter.

With reference now to FIG. 11, a flowchart of a process for retrieving different types of media streams is depicted in accordance with a preferred embodiment of the present invention. The processes in FIG. 11 may be implemented in a SIP control component, such as SIP control 402 in FIG. 4. The processes may be used to enable reception of various types of streams, such as MPEG2.

The process begins by receiving a subscriber request for content (step 1100). This content maybe a media stream, such as, for example, a music or a video stream. A music stream may be, for example, a single song or an entire album. The video stream may be, for example, a music video or a movie.

A determination is made as to whether sufficient bandwidth is available for the requested content (step 1102). If sufficient bandwidth is available, a SIP message is sent to a proxy server to initiate receipt of the requested content (step 1104). Thereafter, the content is received and decoded (step 1106). The decoding may occur using different mechanisms, such as processor 302 in FIG. 3 or a digital signal processor (DSP) in LAN adapter 310 in FIG. 3. A determination is then made as to whether the content is to be presented immediately (step 1108). If the content is to be viewed immediately, the content is sent to the appropriate output device (step 1110) with the process terminating thereafter. Otherwise, the content is stored in a storage device in communication with the set-top device for later presentation (step 1112). The storage device may be, for example, hard disk 328 in FIG. 3 or some other persistent storage device. Then, an alert is sent to let the subscriber know that the content has been received (step 1114) with the process terminating thereafter. This alert may be audio, visual, or a combination of the two using devices connected to or in communication with the set-top device. This alert may be, for example, a message light on the set-top device indicating that a message has been received. A message may be stored identifying the content that has been received for presentation.

With reference again to step 1102, if the bandwidth is insufficient to provide the requested media, an error message is presented to the subscriber (step 1116) with the process terminating thereafter. In this manner, media streams for media, such as music and videos, may be obtained by a subscriber through SIP messaging. Further, with registration procedures for subscribers provided using SIP, a subscriber can have a pay-per-view type of program charged to the subscriber's account at any set-top device that is SIP enabled and provides for registering a subscriber.

Through a SIP enabled set-top device, pages from Web sites may be received using push technology. Pages that are "pushed" to the set-top device may be displayed to a user using a browser program in the set-top device. The browser program provided in the set-top device may be any currently available browser, such as, for example, Netscape Navigator. Netscape Navigator is available from Netscape Communications Corporation. For example, in FIG. 12, a diagram of a Web page pushed to a subscriber is depicted in accordance with a preferred embodiment of the present invention. Page 1200 is displayed on a display device, such as a television, connected to the set-top device. In this example, a current movies link 1202, a current top 40 music link 1204, and a new car link 1206 are present in Web page 1200. A subscriber may select one of these links to obtain pages associated with these links. The subscriber may select links and close the browser using a remote control device in these examples. Of course, other mechanisms may be used to obtain pages. For example, graphical icons may be used to identify pages.

Figure 13:
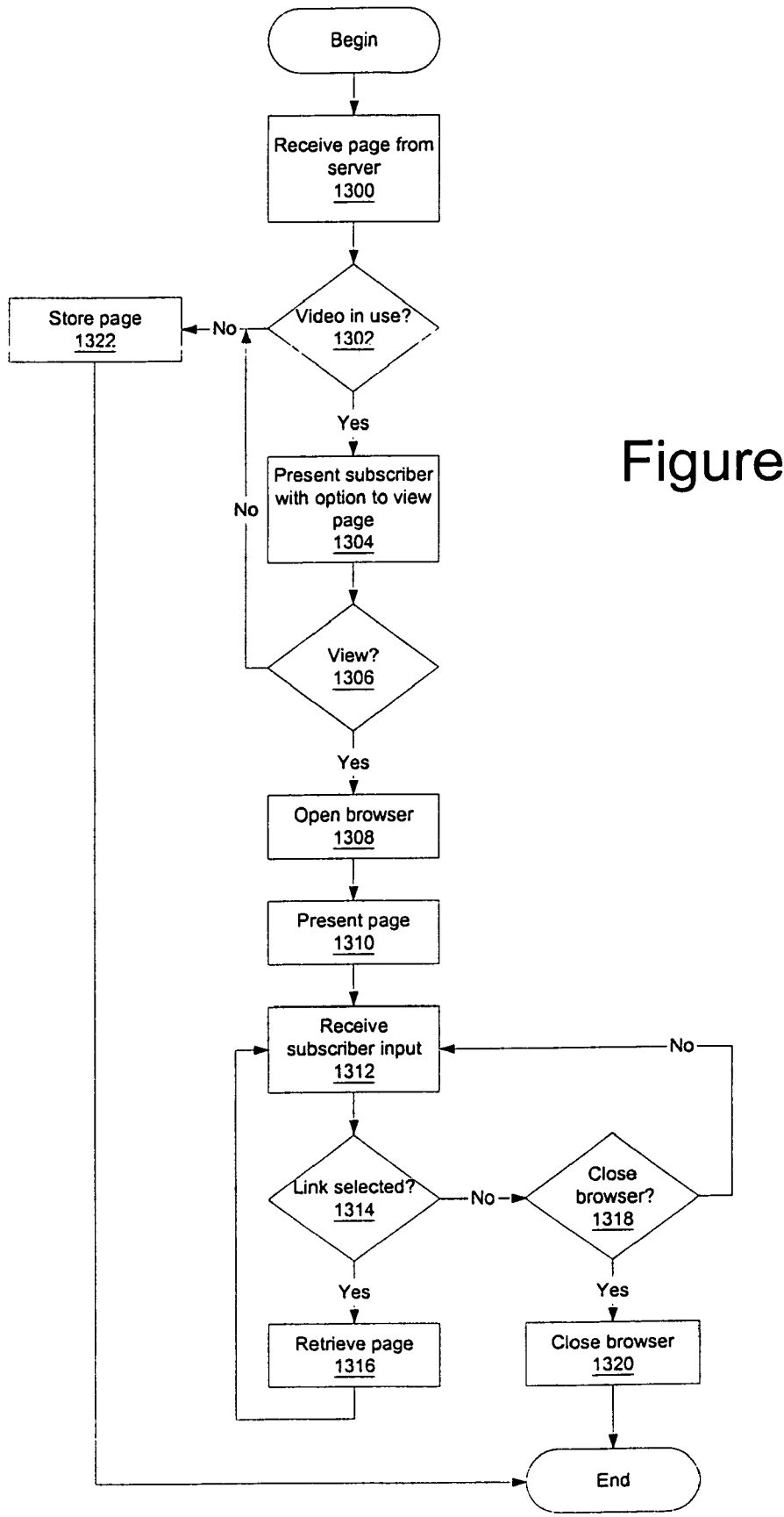
FIG. 13 is a flowchart of a process for SIP enabled browsing in accordance with a preferred embodiment of the present invention.

With reference now to FIG. 13, a flowchart of a process for SIP enabled browsing is depicted in accordance with a preferred embodiment of the present invention. In a fashion similar to receiving a telephone call, SIP messages may be used to indicate a page being pushed to the subscriber. The process begins by receiving a page from the server (step 1300). A server may be the proxy server at which the subscriber is registered. A determination is then made as to whether video is being presented to the subscriber (step 1302). The process may identify active datastreams being sent to devices to see if a video datastream is being presented. More specifically, this identification may be made by determining whether video driver 406 in SIP application 400 in FIG. 4 is sending data to a display device. If video is being presented to the subscriber, an option to view the page is presented to the subscriber (step 1304). If the subscriber selects the option to view the page (step 1306), a browser is opened (step 1308), and the page is presented (step 1310). Thereafter, subscriber input is received (step 1312). A determination is then made as to whether a link has been selected (step 1314). If a link has been selected, a page associated with the link is retrieved (step 1316) with the process then returning to step 1312. Otherwise, a determination is made as to whether the subscriber input is to close the browser (step 1318). If the subscriber input is to close the browser, the browser is closed (step 1320) with the process then terminating. Otherwise, the process returns to step 1312.

With reference again to step 1306, if the subscriber chooses not to view the page, the page is stored for later viewing (step 1322) with the process terminating thereafter. The subscriber may be currently watching a video or may not have time to view the page received from the proxy server. The storing of the page allows the subscriber to view the "pushed" page at a later time. With reference again to step 1302, if the video function is not in use, the process also proceeds to step 1322 as described above. In this situation, the television may be turned off with the subscriber listening to music using the stereo.

Thus, the present invention provides a mechanism for providing a SIP end-point in a communications device, such as SIP application 400 in FIG. 4. The illustrated examples implement a SIP application in a set-top device, which allows various functions and features to be added to a typical set-top device. The present invention increases the capabilities of existing audio and video media devices without replacing them. Further, the processes of the present invention allow for customized features to be tailored or directed to a subscriber at any SIP enabled set-top device at which the subscriber registers. This directing of services and features is enabled through a registration process present in SIP.

It is important to note that while the present invention has been described in the context of a fully functioning communications device, those of ordinary skill in the art will appreciate that the processes of the present invention are capable of being distributed in the form of a computer readable medium of instructions and in a variety of forms. Further, the present invention applies equally regardless of the particular type of signal bearing media actually used to carry out the distribution. Examples of computer readable media include recordable-type media such as floppy disc, a hard disk drive, a RAM, a CD-ROM, a DVD-ROM, and transmission-type media, such as digital and analog communications links, wired or wireless communications links using transmission forms, such as, for example, radio frequency and light wave transmissions. The computer readable media may take the form of coded formats that are decoded for actual use in a particular communications device.

The description of the present invention has been presented for purposes of illustration and description, and is not intended to be exhaustive or limited to the invention in the form disclosed. Many modifications and variations will be apparent to those of ordinary skill in the art. For example, although the depicted examples used SIP, other application-layer control protocols may be used in place of SIP. Further, the SIP application of the present invention may be implemented in devices other than a set-top device, as shown in the examples. A computer, a television, and an adapter for use in a computer are some examples of other devices in which the SIP application may be implemented. The embodiment was chosen and described in order to best explain the principles of the invention, the practical application, and to enable others of ordinary skill in the art to understand the invention for various embodiments with various modifications as are suited to the particular use contemplated.

What is claimed is:

1. A multimedia unit comprising:
a session initiation protocol control unit, wherein the session initiation protocol control unit communicates with a server over a packet based network to receive multimedia content; and a multimedia interface, wherein the multimedia interface sends the multimedia content received by the session initiation protocol control unit to output devices for presentation, wherein the session initiation protocol unit communicates with the server to identify a user of the multimedia unit from a plurality of registered users of the multimedia unit, and wherein the multimedia interface receives multimedia content from the server based on the identification of the user of the multimedia unit;

a processing unit coupled to the multimedia interface and the communication interface, wherein the processing unit determines a type of the multimedia content being sent to the output devices by the multimedia interface, determines if an alert may be output based on the type of the multimedia content, and output an alert if it is determined that an alert may be output based on the type of the multimedia content, wherein the processing unit
determines a type of the multimedia content,
determines if an alert may be output, and
outputs the alert in response to the multimedia interface receiving at least one of
a call being directed to the multimedia unit,
a message being sent to the multimedia unit, and
a Web page being pushed to the multimedia unit.

2. A multimedia unit comprising:
a session initiation protocol control unit, wherein the session initiation protocol control unit communicates with a server over a packet based network to receive multimedia content; and a multimedia interface, wherein the multimedia interface sends the multimedia content received by the session initiation protocol control unit to output devices for presentation, wherein the session initiation protocol unit communicates with the server to identify a user of the multimedia unit from a plurality of registered users of the multimedia unit, and wherein the multimedia interface receives multimedia content from the server based on the identification of the user of the multimedia unit;
a processing unit coupled to the multimedia interface and the communication interface, wherein the processing unit determines a type of the multimedia content being sent to the output devices by the multimedia interface, determines if an alert may be output based on the type of the multimedia content, and output an alert if it is determined that an alert may be output based on the type of the multimedia content wherein the alert is based on a message being sent to the multimedia unit, and wherein if the processing unit determines that an alert cannot be output based on the type of the multimedia content, the processing unit determines if a timeout condition has occurred, and if a timeout condition has occurred, the message is stored for later presentation using the multimedia unit.

3. A set-top device comprising:
first means for sending an identification of a user of the set-top device to a server, wherein a plurality of users of the set-top devices are registered as users of the set-top device;
second sending means for sending a request for content to a server using a connection established with an application layer control protocol;
receiving means for receiving the content from the server through the connection, wherein the content is received from the server based on the identification of the user of the set-top device; and
presenting means for presenting the content on output devices connected to the set-top device
means for determining a type of the content being sent to the output devices;
means for determining if an alert may be output based on the type of the content; and
means for outputting an alert if it is determined that an alert may be output based on the type of the content
wherein the means for determining a type of the content, means for determining if an alert may be output, and means for outputting the alert operate in response to receiving at least one of a call being directed to the set-top device, a message being sent to the set-top device, and a Web page being pushed to the set-top device.

4. A computer program product in a recordable-type computer readable medium for providing services to a set-top device, the computer program product comprising:

first instructions for sending an identification of a user of the set-top device to a server, wherein a plurality of users of the set-top device are registered as uses of the set-top device;

second instructions for sending a request for content to a server using a connection established with an application layer control protocol;

third instructions for receiving the content from the server through the connection, wherein the content is received from the server based on the identification of the user of the set-top device; and fourth instructions for presenting the content on output devices connected to the set-top device fifth instructions for determining a type of the content being sent to the output devices;

sixth instructions for determining if an alert may be output based on the type of the content; and seventh instructions for outputting an alert if it is determined that an alert may be output based on the type of the content wherein the fifth instructions for determining a type of the content, sixth instructions for determining if an alert may be output, and seventh instructions for outputting the alert are executed in response to receiving at least one of a call being directed to the set-top device, a message being sent to the set-top device, and a Web page being pushed to the set-top device.

* * * * *

UNITED STATES PATENT AND TRADEMARK OFFICE
CERTIFICATE OF CORRECTION

| | | |
|---|---|---|
| PATENT NO. | : 7,024,461 B1 | Page 1 of 1 |
| APPLICATION NO. | : 09/561834 | |
| DATED | : April 4, 2006 | |
| INVENTOR(S) | : Janning et al. | |

It is certified that error appears in the above-identified patent and that said Letters Patent is hereby corrected as shown below:

Col. 15, line 11: after "as" delete "uses" and insert --users--.

Signed and Sealed this

Fifth Day of December, 2006

JON W. DUDAS
*Director of the United States Patent and Trademark Office*